United States Patent
Ding et al.

(10) Patent No.: US 9,798,418 B2
(45) Date of Patent: Oct. 24, 2017

(54) IN-CELL TOUCH PANEL AND DISPLAY DEVICE

(71) Applicants: BOE Technology Group Co., Ltd., Beijing (CN); Beijing BOE Optoelectronics Technology Co., Ltd., Beijing (CN)

(72) Inventors: Xiaoliang Ding, Beijing (CN); Haisheng Wang, Beijing (CN); Yingming Liu, Beijing (CN); Wei Liu, Beijing (CN); Changfeng Li, Beijing (CN); Tao Ren, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 17 days.

(21) Appl. No.: 14/892,399

(22) PCT Filed: Jun. 15, 2015

(86) PCT No.: PCT/CN2015/081415
§ 371 (c)(1),
(2) Date: Nov. 19, 2015

(87) PCT Pub. No.: WO2016/115813
PCT Pub. Date: Jul. 28, 2016

(65) Prior Publication Data
US 2016/0357334 A1    Dec. 8, 2016

(30) Foreign Application Priority Data

Jan. 22, 2015 (CN) .......................... 2015 1 0033182

(51) Int. Cl.
*G09G 5/00* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01)

(58) Field of Classification Search
USPC ................................................. 345/156, 178
See application file for complete search history.

(56) References Cited

U.S. PATENT DOCUMENTS

2016/0266675 A1*    9/2016    Yang ..................... G06F 3/0412

FOREIGN PATENT DOCUMENTS

| CN | 103279247 A | 9/2013 |
|----|-------------|--------|
| CN | 103631463 A | 3/2014 |

(Continued)

OTHER PUBLICATIONS

Sep. 14, 2015—International Search Report and Written Opinion Appn PCT/CN2015/081415 with English Tran.

(Continued)

*Primary Examiner* — William Boddie
*Assistant Examiner* — Alecia D English
(74) *Attorney, Agent, or Firm* — Banner & Witcoff, Ltd.

(57) ABSTRACT

An in-cell touch panel and a display device are provided. The in-cell touch panel comprises a plurality of self-capacitance electrodes, a touch detection chip, and a plurality of conductive lines connecting the plurality of self-capacitance electrodes to the touch detection chip. The plurality of self-capacitance electrodes are arranged in columns, and any two self-capacitance electrodes in two adjacent columns are not in a same row; or, the plurality of self-capacitance electrodes are arranged in rows, and any two self-capacitance electrodes in two adjacent rows are not in a same (Continued)

column. The touch detection chip determines a touch position by detecting signals of the self-capacitance electrodes.

8 Claims, 8 Drawing Sheets

(56) References Cited

FOREIGN PATENT DOCUMENTS

| CN | 104020906 A | 9/2014 |
|---|---|---|
| CN | 104503651 A | 4/2015 |
| WO | 2013009117 A2 | 1/2013 |

OTHER PUBLICATIONS

Dec. 26, 2016—(CN) First Office Action Appn 201510033182.7 with English Tran.
Jun. 7, 2017—(CN) Second Office Action Appn 201510033182.7 with English Tran.

\* cited by examiner

IN-CELL TOUCH PANEL AND DISPLAY DEVICE

The application is a U.S. National Phase Entry of International Application No. PCT/CN2015/081415 filed on Jun. 15, 2015, designating the United States of America and claiming priority to Chinese Patent Application No. 201510033182.7 filed on Jan. 22, 2015. The present application claims priority to and the benefit of the above-identified applications and the above-identified applications are incorporated by reference herein in their entirety.

TECHNICAL FIELD

Embodiments of the present disclosure relate to an in-cell touch panel and a display device

BACKGROUND

With rapid developments of display technology, a touch panel has gradually gained popularity throughout people's life. The touch panel is divided into three types in accordance with its structure: an add-on mode touch panel, an on-cell mode touch panel and an in-cell mode touch panel. The add-on mode touch panel is a LCD panel with a touch function and comprises a touch screen and a Liquid Crystal Display (LCD) which are produced separately and then bonded together; the add-on mode touch panel has shortcomings such as high production cost, low light transmittance, large thickness and the like. In the in-cell mode touch panel, a touch electrode is embedded inside the LCD so as to reduce the thickness of the touch panel and greatly reduce the production cost; so, the in-cell mode touch panel gradually wins favor of manufacturers.

The in-cell touch panel is provided with a plurality of self-capacitance electrodes insulated from each other. In the case that the touch panel is not touched, a capacitance between the self-capacitance electrode and its adjacent self-capacitance electrode is a capacitance C1 with constant value; and, in the case that the touch panel is touched, the value of the capacitance C1 changes. Coordinates corresponding to respective self-capacitance electrodes are stored in advance in a touch detection chip, and a touch position where the capacitance value changes is determined according to the capacitance value output from signal lines connected to the self-capacitance electrodes.

Referring to FIG. 1, in the in-cell touch panel 10, the self-capacitance electrodes 11 are arranged in an array and each of the self-capacitance electrodes 11 is connected to the touch detection chip 13 through a conductive line 12. Referring to FIG. 2, in the case that the touch panel is touched, digits of the self-capacitance electrodes that are touched represent signal intensity values of the self-capacitance electrodes, and digits of the self-capacitance electrodes that are not touched represent a noise signal; furthermore, in the case that the touch position 14 is located in a center of a region of the adjacent self-capacitance electrodes 11, the capacitance change value of each of the adjacent self-capacitance electrode 11 is small because each self-capacitance electrode 11 at the touch position 14 is uniformly touched. Accordingly, a maximum signal intensity output to the touch detection chip 13 is weak, so that the signal for determining the touch position has a low signal to noise ratio.

SUMMARY

According to embodiments of the present disclosure, there is provided an in-cell touch panel. The in-cell touch panel comprises: a plurality of self-capacitance electrodes, a touch detection chip, and a plurality of conductive lines connecting the plurality of self-capacitance electrodes to the touch detection chip. The plurality of self-capacitance electrodes are arranged in columns, and any two self-capacitance electrodes in two adjacent columns are not in a same row; or, the plurality of self-capacitance electrodes are arranged in rows, and any two self-capacitance electrodes in two adjacent rows are not in a same column. The touch detection chip determines a touch position by detecting signals of the self-capacitance electrodes.

For example, the plurality of self-capacitance electrodes are arranged in columns, the self-capacitance electrodes in odd-numbered columns are arranged in rows and the self-capacitance electrodes in even-numbered columns are arranged in rows.

For example, a connecting line between edges of the self-capacitance electrodes in two adjacent odd-numbered columns passes a central point of the self-capacitance electrode in the even-numbered column between the two adjacent odd-numbered columns; a connecting line between edges of the self-capacitance electrodes in two adjacent even-numbered columns passes a central point of the self-capacitance electrode in the odd-numbered column between the two adjacent even-numbered columns.

For example, the plurality of self-capacitance electrodes are arranged in rows, the self-capacitance electrodes in odd-numbered rows are arranged in columns and the self-capacitance electrodes in even-numbered rows are arranged in columns.

For example, a connecting line between edges of the self-capacitance electrodes in two adjacent odd-numbered rows passes a central point of the self-capacitance electrode in the even-numbered row between the two adjacent odd-numbered rows; a connecting line between edges of the self-capacitance electrodes in two adjacent even-numbered rows passes a central point of the self-capacitance electrode in the odd-numbered row between the two adjacent even-numbered rows.

For example, the plurality of self-capacitance electrodes are arranged in a same layer.

According to the embodiments of the present disclosure, there is provided a display device. The display device comprises the in-cell touch panel as described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 3:
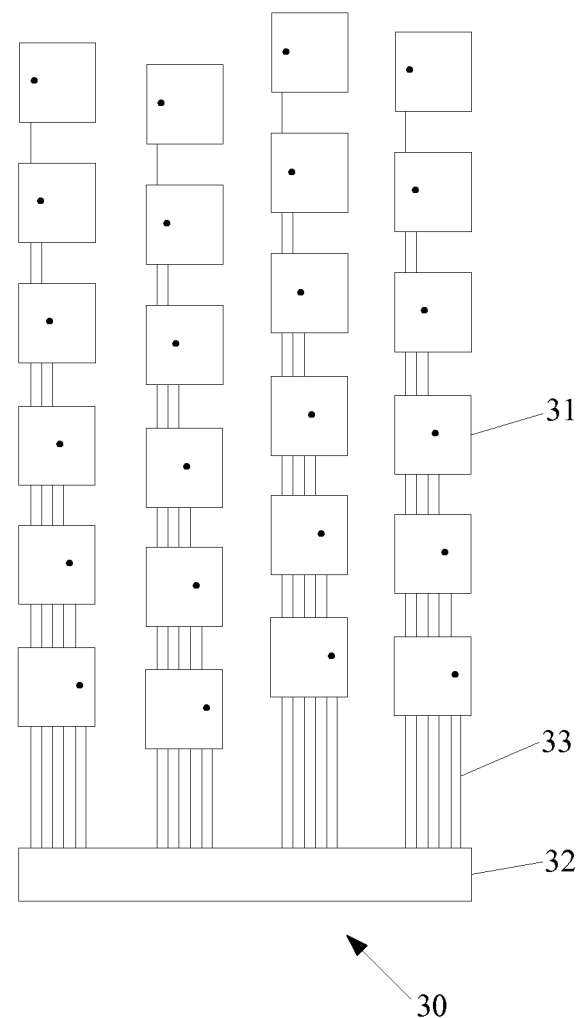
FIG. 3 is a structural schematic view illustrating an in-cell touch panel according to embodiments of the present disclosure.
Figure 4:
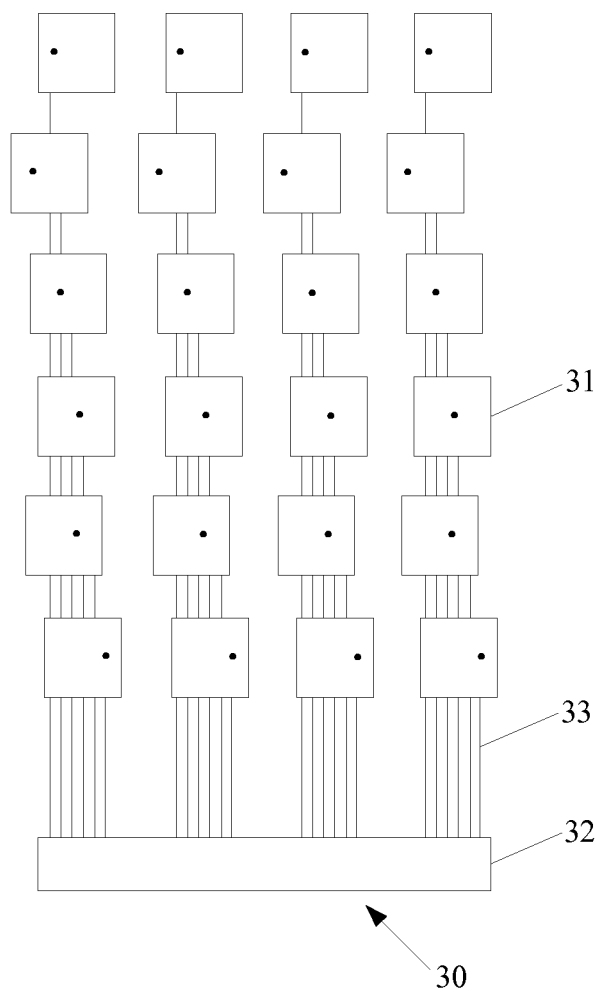
FIG. 4 is a structural schematic view illustrating another in-cell touch panel according to the embodiments of the present disclosure.

Referring to FIG. 3 and FIG. 4, an in-cell touch panel 30 according to embodiments of the present disclosure comprises: a plurality of self-capacitance electrodes 31, a touch detection chip 32, and a plurality of conductive lines 33 connecting the plurality of self-capacitance electrodes 31 to the touch detection chip 32. Referring to FIG. 3, the plurality of self-capacitance electrodes 31 are arranged in columns, and any two self-capacitance electrodes 31 in two adjacent columns are not in a same row, that is, the self-capacitance electrode 31 in a column and the self-capacitance electrode 31 in its adjacent column are not in the same row. Alternatively, referring to FIG. 4, the plurality of self-capacitance electrodes 31 are arranged in rows, and any two self-capacitance electrodes 31 in two adjacent rows are not in a same column, that is, the self-capacitance electrode 31 in a row and the self-capacitance electrode 31 in its adjacent row are not in the same column. The touch detection chip 32 determines a touch position by detecting signals of the self-capacitance electrodes 31.

Figure 1:
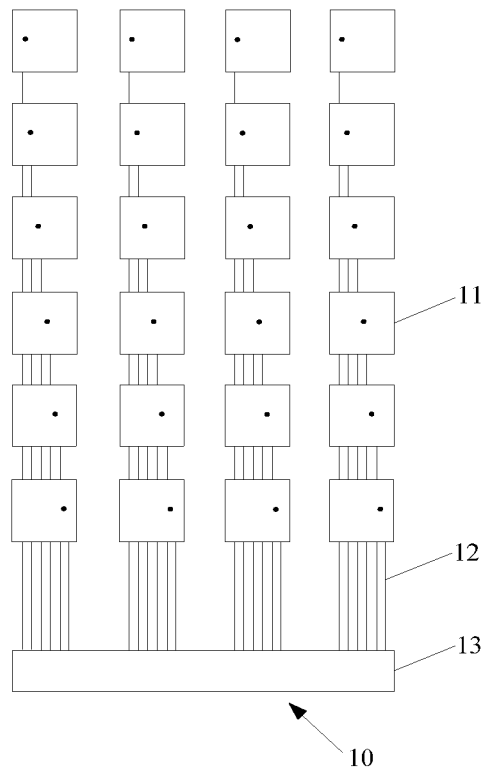
FIG. 1 is a structural schematic view illustrating an in-cell touch panel according to one technique.
Figure 2:
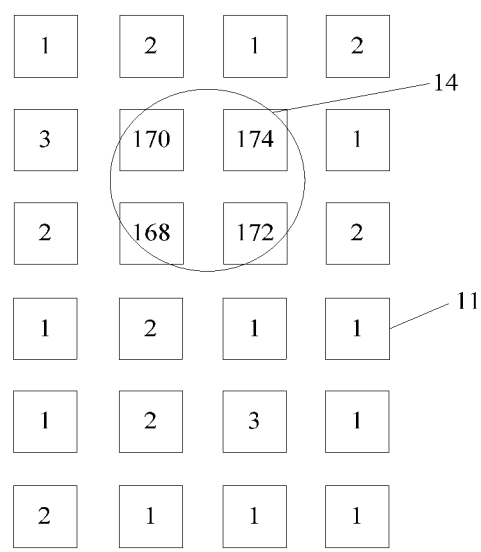
FIG. 2 is a schematic view illustrating signal intensity values of self-capacitance electrodes in FIG. 1.
Figure 5:
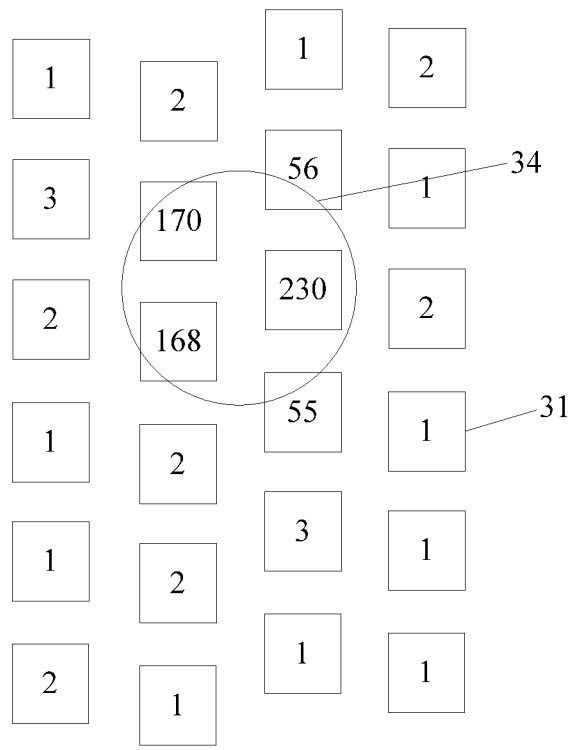
FIG. 5 is a schematic view illustrating signal intensity values of self-capacitance electrodes in FIG. 3.
Figure 6:
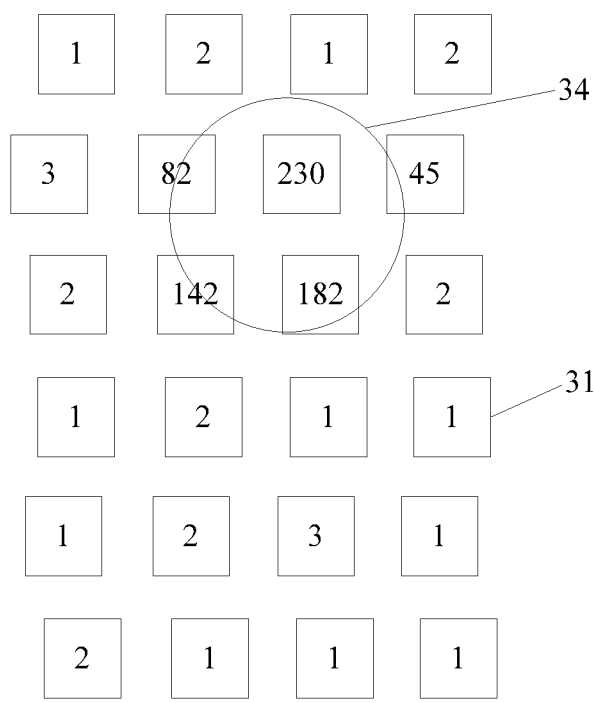
FIG. 6 is a schematic view illustrating signal intensity values of self-capacitance electrodes in FIG. 4.

In the in-cell touch panel according to the embodiments of the present disclosure, since the self-capacitance electrodes 31 in adjacent columns are arranged in different rows or the self-capacitance electrodes 31 in adjacent rows are arranged in different columns, it is impossible that a central point of the touch position has a same distance to the adjacent self-capacitance electrodes that are touched. Thus, the touch signals are impossible to be evenly distributed to the adjacent self-capacitance electrodes 31 that are touched; and in this case, the touch signals of one or more self-capacitance electrodes 31 are the maximum. Referring to FIG. 2, FIG. 5 and FIG. 6, digits of the self-capacitance electrodes 31 in the figures represent the signal intensity values of the self-capacitance electrodes 31 that are touched. In the case that the touch position 34 is the same, the maximum signal intensity of the self-capacitance electrodes 11 in the prior art is 174 as shown in FIG. 2, whereas the maximum signal intensity of the self-capacitance electrodes 31 according to the embodiments of the present disclosure is 230 as shown in FIG. 5 and FIG. 6. Accordingly, in the in-cell touch panel according to the embodiments of the disclosure, the maximum intensity of the signals output to the touch detection chip 32 is improved; and a signal to noise ratio of the signals for determining the touch position is increased.

Figure 7:
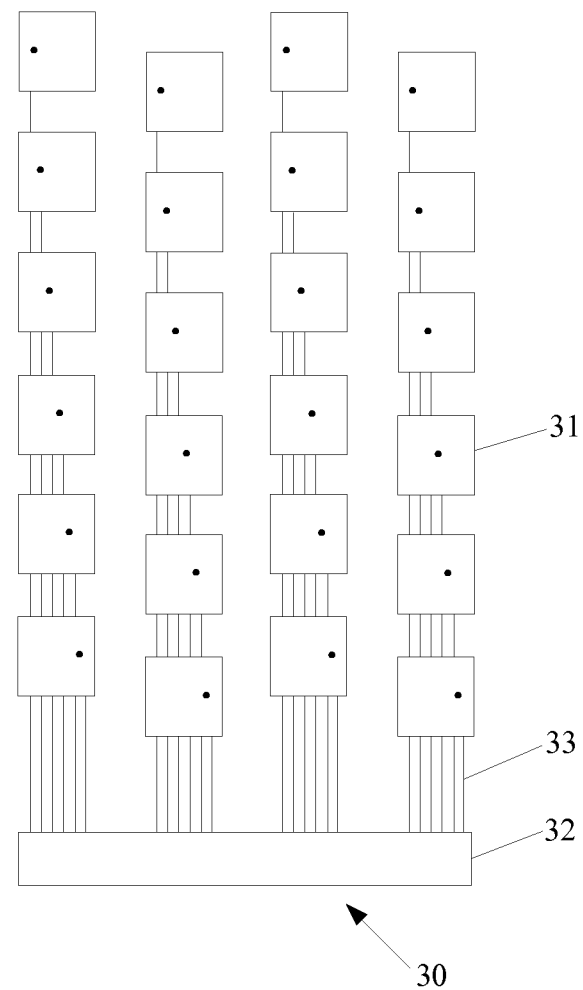
FIG. 7 is a modification of the in-cell touch panel in FIG. 3.

To simplify design and production of the self-capacitance electrodes 31, for example, referring to FIG. 7, the plurality of self-capacitance electrodes 31 are arranged in columns, the self-capacitance electrodes in odd-numbered columns are arranged in rows and the self-capacitance electrodes in even-numbered columns are arranged in rows.

Figure 8:
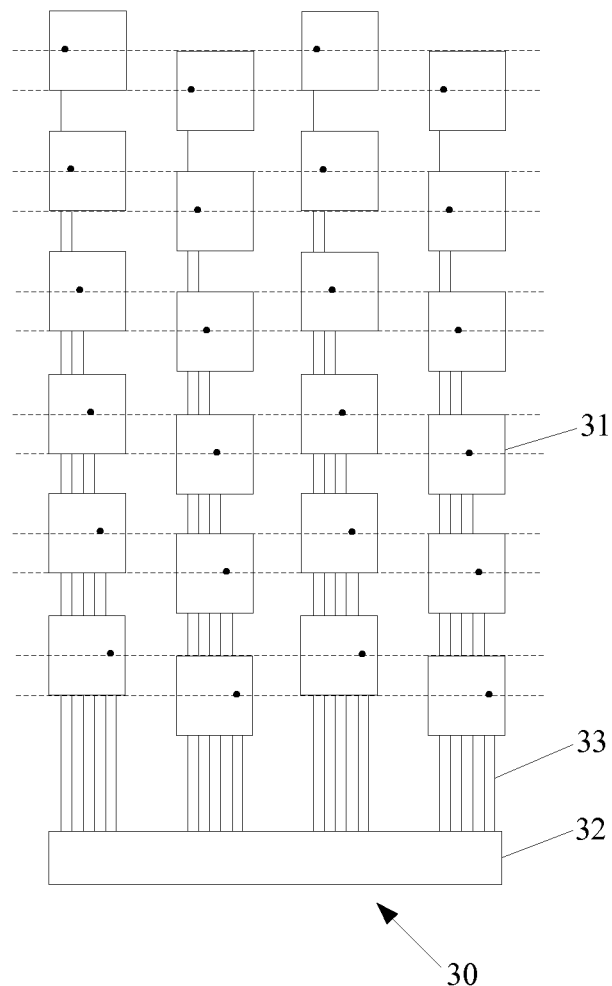
FIG. 8 is a modification of the in-cell touch panel in FIG. 7.

Referring to FIG. 8, for example, a connecting line between edges of the self-capacitance electrodes 31 in two adjacent odd-numbered columns passes a central point of the self-capacitance electrode 31 in the even-numbered column between the two adjacent odd-numbered columns; a connecting line between edges of the self-capacitance electrodes 31 in two adjacent even-numbered columns passes a central point of the self-capacitance electrode 31 in the odd-numbered column between the two adjacent even-numbered columns.

Figure 9:
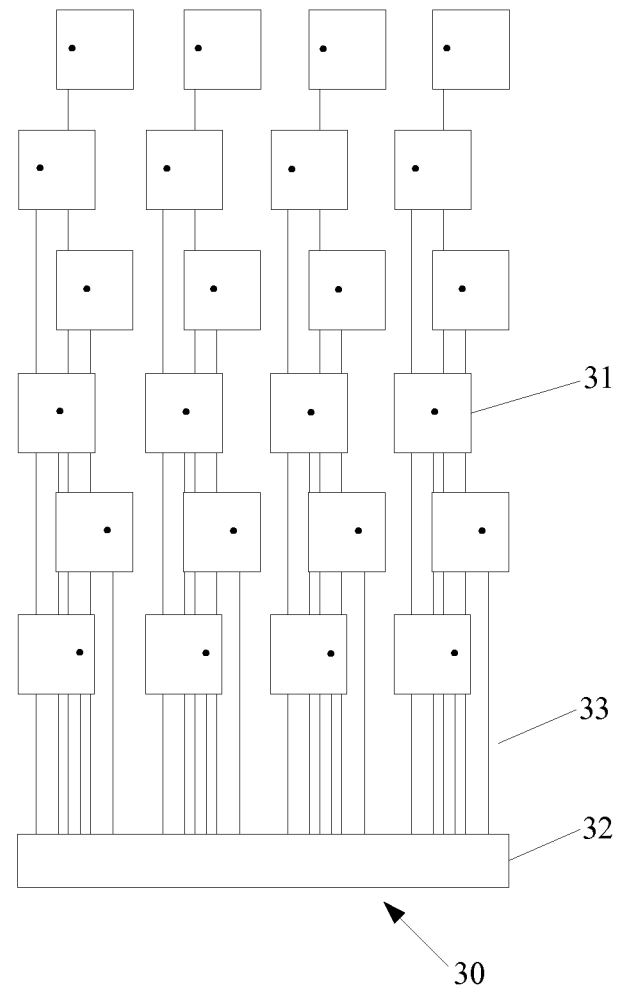
FIG. 9 is a modification of the in-cell touch panel in FIG. 4.

Similarly, to simplify design and production of the self-capacitance electrodes 31, for example, referring to FIG. 9, the plurality of self-capacitance electrodes 31 are arranged in rows, the self-capacitance electrodes 31 in odd-numbered rows are arranged in columns and the self-capacitance electrodes 31 in even-numbered rows are arranged in columns.

Figure 10:
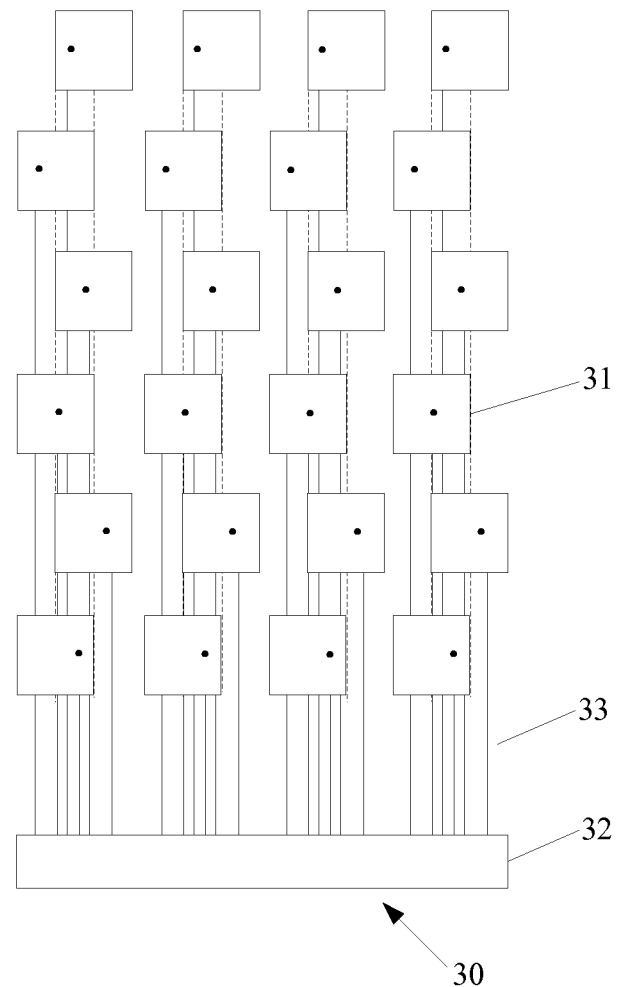
FIG. 10 is a modification of the in-cell touch panel in FIG. 9.

Referring to FIG. 10, for example, a connecting line between edges of the self-capacitance electrodes 31 in two adjacent odd-numbered rows passes a central point of the self-capacitance electrode 31 in the even-numbered row between the two adjacent odd-numbered rows; a connecting line between edges of the self-capacitance electrodes 31 in two adjacent even-numbered rows passes a central point of the self-capacitance electrode 31 in the odd-numbered row between the two adjacent even-numbered rows.

For example, the plurality of self-capacitance electrodes 31 are arranged in a same layer.

The embodiments of the present disclosure further provide a display device, and the display device comprises the in-cell touch panel 30.

In the display device according to the embodiments of the present disclosure, since the self-capacitance electrodes 31 in adjacent columns are arranged in different rows or the self-capacitance electrodes 31 in adjacent rows are arranged in different columns, it is impossible that the central point of the touch position has a same distance to the adjacent self-capacitance electrodes that are touched. Thus, the touch signals are impossible to be evenly distributed to the adjacent self-capacitance electrodes 31 that are touched; and in this case, the touch signals of one or more self-capacitance electrodes 31 are the maximum. Accordingly, in the display device according to the embodiments of the disclosure, the maximum intensity of the signals output to the touch detection chip 32 is improved; and a signal to noise ratio of the signals for determining the touch position is increased.

The display device according to the embodiments of the present disclosure comprises the in-cell touch panel 30. As for the specific structure of the in-cell touch panel 30, the above descriptions of the in-cell touch panel 30 according to the embodiments can be referred to, which will not be repeated here. The in-cell touch panel and the display device according to the embodiments of the present disclosure are applied to determine the touch position, but not limited thereto.

In the above descriptions of the embodiments of the disclosure, specific features, structures, materials, or characteristics can be combined in an appropriate way in any or more embodiments or examples.

The foregoing embodiments merely are exemplary embodiments of the disclosure, and not intended to define the scope of the disclosure, and the protection scope of the disclosure is determined by the claims.

The present application claims priority of Chinese Patent Application No. 201510033182.7 filed on Jan. 22, 2015, the disclosure of which is incorporated herein by reference in its entirety as part of the present application.

The invention claimed is:

1. An in-cell touch panel, comprising a plurality of self-capacitance electrodes, a touch detection chip, and a plurality of conductive lines connecting the plurality of self-capacitance electrodes to the touch detection chip, wherein,
   the plurality of self-capacitance electrodes are arranged in columns, and any two self-capacitance electrodes in two adjacent columns are not in a same row; and
   the touch detection chip determines a touch position by detecting signals of the self-capacitance electrodes;
   the self-capacitance electrodes in odd-numbered columns are arranged in rows and the self-capacitance electrodes in even-numbered columns are arranged in rows;
   a connecting line between edges of the self-capacitance electrodes in two adjacent odd-numbered columns passes a central point of the self-capacitance electrode in the even-numbered column between the two adjacent odd-numbered columns; and
   a connecting line between edges of the self-capacitance electrodes in two adjacent even-numbered columns passes a central point of the self-capacitance electrode in the odd-numbered column between the two adjacent even-numbered columns.

2. The in-cell touch panel according to claim 1, wherein the plurality of self-capacitance electrodes are arranged in a same layer.

3. A display device, comprising the in-cell touch panel according to claim 1.

4. The display device according to claim 3, wherein the plurality of self-capacitance electrodes are arranged in a same layer.

5. An in-cell touch panel, comprising a plurality of self-capacitance electrodes, a touch detection chip, and a plurality of conductive lines connecting the plurality of self-capacitance electrodes to the touch detection chip, wherein,
   the plurality of self-capacitance electrodes are arranged in rows, and any two self-capacitance electrodes in two adjacent rows are not in a same column;
   the touch detection chip determines a touch position by detecting signals of the self-capacitance electrodes;
   the self-capacitance electrodes in odd-numbered rows are arranged in columns and the self-capacitance electrodes in even-numbered rows are arranged in columns;
   a connecting line between edges of the self-capacitance electrodes in two adjacent odd-numbered rows passes a central point of the self-capacitance electrode in the even-numbered row between the two adjacent odd-numbered rows; and
   a connecting line between edges of the self-capacitance electrodes in two adjacent even-numbered rows passes a central point of the self-capacitance electrode in the odd-numbered row between the two adjacent even-numbered rows.

6. The in-cell touch panel according to claim 5, wherein the plurality of self-capacitance electrodes are arranged in a same layer.

7. A display device, comprising the in-cell touch panel according to claim 5.

8. The display device according to claim 7, wherein the plurality of self-capacitance electrodes are arranged in a same layer.

* * * * *